2 Sheets—Sheet 1.

P. H. SAMUELL.
Device for Unloading Wagons and Dumping them.

No. 226,425. Patented April 13, 1880.

Witnesses
John Bruno
O. Barnevelt.

Inventor
Pascal H. Samuell
by E. Thurlow, atty
in fact

2 Sheets—Sheet 2.

P. H. SAMUELL.
Device for Unloading Wagons and Dumping them.
No. 226,425. Patented April 13, 1880.

Witnesses
John Bruno
O. Barnevelt

Inventor
Pascal H. Samuell
by E. Thurlow, his atty.
in fact

N. PETERS, PHOTO-LITHOGRAPHER, WASHINGTON, D. C.

UNITED STATES PATENT OFFICE.

PASCAL H. SAMUELL, OF EASTON, ILLINOIS.

DEVICE FOR UNLOADING WAGONS AND DUMPING THEM.

SPECIFICATION forming part of Letters Patent No. 226,425, dated April 13, 1880.

Application filed February 24, 1880.

*To all whom it may concern:*

Be it known that I, PASCAL H. SAMUELL, of Easton, in the county of Mason, in the State of Illinois, have invented an Improvement in Unloading Wagons and Dumping them; and I do hereby declare that the following is a full, clear, and exact description thereof, reference being had to the annexed drawings, making a part of this specification, in which like letters of reference refer to like parts, and in which—

Figure 1:
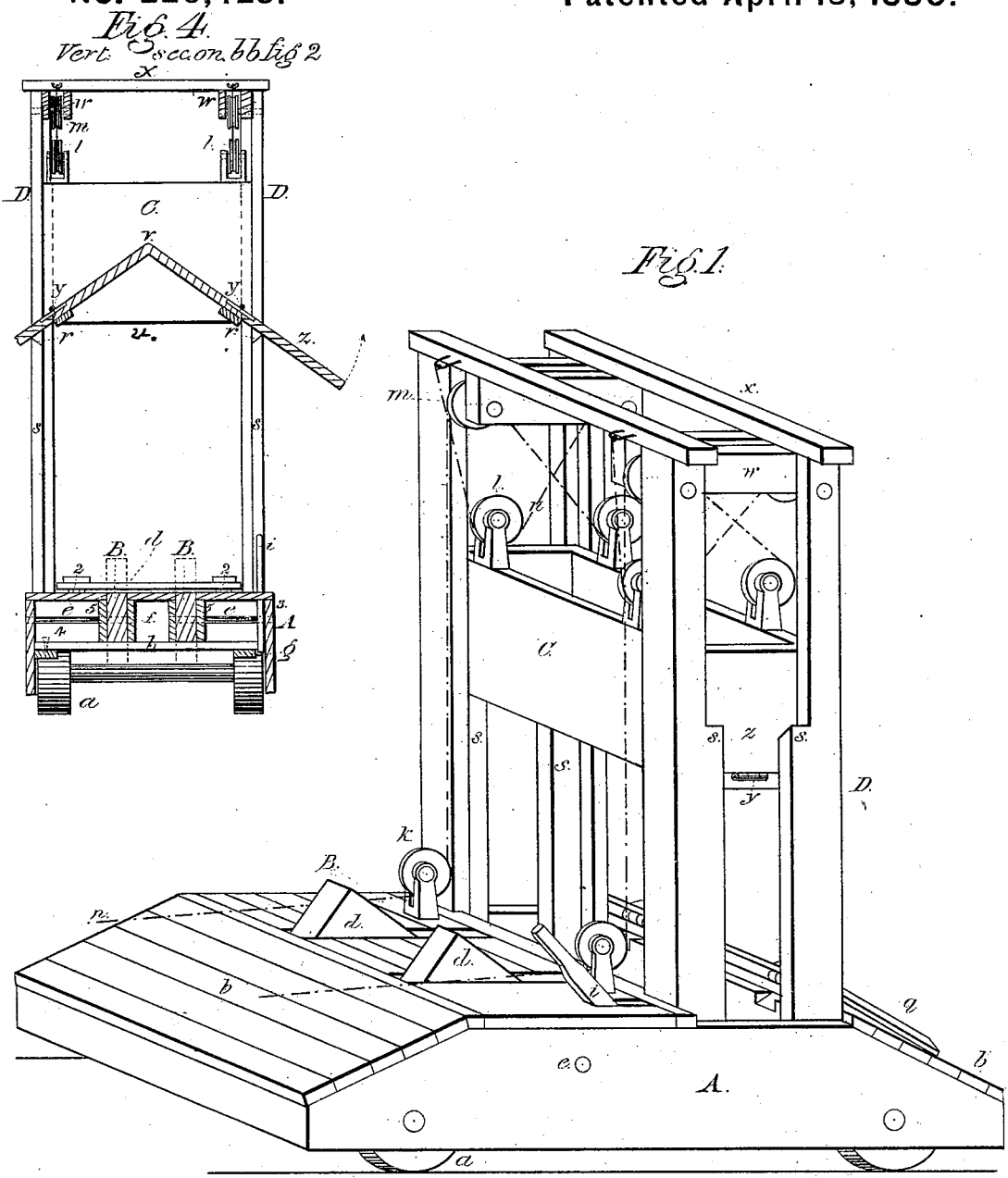
Figure 2:
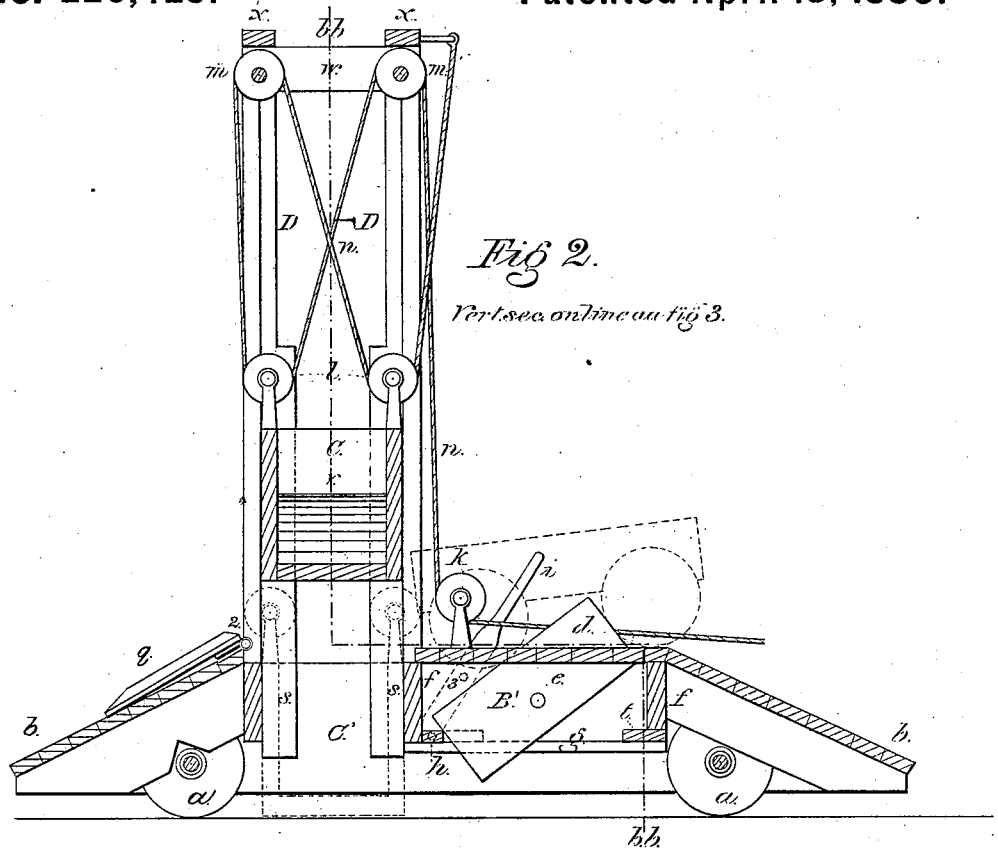
Figure 3:
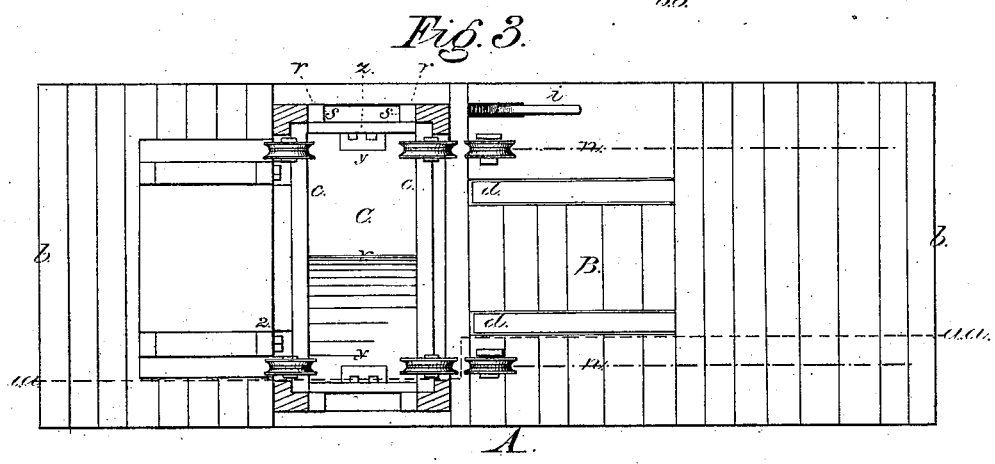

Figure 1 represents a perspective view; Fig. 2, a longitudinal vertical section on line $a\ a$, Fig. 3; Fig. 3, a plan view, with horizontal section of upper frame or guides; Fig. 4, vertical cross-section on line $b\ b$, Fig. 2.

Great difficulty has been hitherto experienced among corn and grain handlers in manipulating the present forms of wagon-elevators, in which the load is discharged into cars, cribs, or warehouses, such apparatus being complicated and frequently laid by as inoperative.

My invention obviates the hoisting of the wagon by dumping the load into an elevating-box below the wagon-platform and raising the same by means of tackle to the desired height by means of the draft-animals, whence the load is discharged automatically from either or both sides of the box into the desired receptacle, as a line of cars, cribs, or warehouses, &c.

It consists of a wheeled platform for moving on a tramway, if desired, having an ascent and descent at either end for the draft-animal and wagon, and a wagon-dump which lowers the rear wheels to dump the load into said elevating-box below the level of said platform. This box is suspended by means of a rope and pulleys or tackle to the center of a guide-frame above. The box may have a bottom sloping toward its discharge end or side, or to both ends or sides, if desired, such discharge-openings being covered by a door or trap hinged to the bottom of edge of said box, so as to fall automatically outward on reaching the proper elevation to deliver the load into a spout or conductor.

One of the forms in which I construct this apparatus is as follows: A represents a wagon-platform, with ascent and descent $b\ b$ and wheels $a\ a$ for locomotion, and containing an ordinary wagon-dump, B, below the floor, having pivoted wheel-blocks B B, pivoted at $e\ e$ between the joists $f\ f$ and side cheeks, $5\ 5$, pivoted dump-support $h$, with dumping-lever $i$; C′, a recess below the surface or floor of the platform adjoining said dump, and containing an elevating-box, C, whose corners are embraced by the respective recesses in the several vertical guide posts or frame D D D D. Said box has flapped ends $z\ z$, opening to each side of the platform, and each hinged to the lower part of its respective opening or bottom $u$ of the box.

$l\ l\ l\ l$ are pulleys, attached respectively to the several corners of said box at its upper edge, to receive the several ropes $n\ n$.

D D D D are the four posts forming the frame of the hoist, whose respective inner angles are recessed from top to bottom to receive the respective corners of the box C, and each rising from the depths of the recess C′ in the platform, and terminating at the braces $w\ x$, which tie them above.

$w\ w$ are joists, between pairs of which are pivoted the pulleys $m\ m$, over which pass the ropes which hoist that part of the box over which they are respectively placed.

$s\ s$ are vertical lateral extensions of the respective posts D, projecting over the edges of said box merely far enough to cover the respective edges of each flap $z\ z$, each extension $s$ extending in height just so far as that point at which it is desired to discharge the loaded box. These extensions $s$ may be constructed to be moved vertically to gage the height at which it is desired to empty said box. Each extension $s$ ends above in a beveled shoulder, $r\ r$, which, on the rising of the box-flap $z$ to that point, liberates the respective flaps $z$ to discharge corn, grain, &c., and also closes them on the descent of the box.

Two hoisting-ropes, $n\ n$, are used, one for either end of the box. These are each fastened to one of the cross-ties $x$, or above the nearest pulley $m$, thence, descending beneath the pulley $l$ below at the end of the box, passes up over the other pulley $m$ above the same end of said box, thence, descends vertically beneath the corresponding pulley $l$ below it, thence diagonally upward over the pulley $m$ close to the origin of said rope, thence again vertically to and beneath the platform-pulley $k$, thence horizontally to the draft-animals used to hoist the box.

The flap $q$ is a hinged portion of the platform-floor for covering the box-recess $C'$.

The operation of this apparatus needs little description. The wagon passes up the ascent $b$ over the door $q$, now closed, onto the dump B, the box C being within its recess $C'$. Now the rear wheels of the wagon are lowered by means of the dump-lever $i$ and dump-blocks B, and the load is discharged into said box, whereupon the lower ends of the respective ropes $n$ are attached to the draft-animals, elevating the box and load, so that when the sides $z$ of same are liberated by rising above the shoulders $r$ $r$, &c., said flaps or doors $z$ fall outward and discharge the load from the anticlinal box-bottom $v$, upon which the team is backed, the box lowered, the flaps $z$ closing automatically by means of shoulders $r$ and extensions $s$ of the posts D. When the crib or car, &c., is full at that particular receiving-opening the apparatus is moved forward a few paces to repeat the hoisting and dumping at a new opening, and at cribs or cars, &c., on either side of the hoist, if necessary.

What I claim as my invention is—

1. A wagon-dump, combined with an elevating-box for corn or produce, the box and dump placed in adjoining recesses below the floor of the platform or movable wagon-ascent, the box arranged to be hoisted by means of pulleys and ropes, and ascending within guide-posts, and constructed to empty itself at one or both ends or sides automatically by means of one or more hinged flaps, which fall outward on arriving at the desired height, substantially as and for the purposes described.

2. A hoisting-frame in a corn or produce elevator, whose vertical posts are recessed to receive the respective angles of an elevating-box, and with lateral vertical extensions lapping over one or more hinged flaps in said box and rising to the height at which said flap is designed to fall and discharge the contents of said box, substantially as and for the purposes described.

3. In a portable grain-hoist, an elevating-box, C, having one or more gravitating flaps, $z$, hinged to its bottom or walls, arranged to be opened automatically on arriving at a desired height, substantially as described.

4. The guide frame or posts D, with beveled shoulders $r$ of the lateral extensions $s$ in front of the box-flaps $z$, in combination with the box C or an elevating-box, substantially as and for the purposes described.

5. The combination of elevating-box C, guides D, having extensions $s$, with platform A, having dump B, and box-recess $C'$, substantially as described.

6. The combination, with elevating-box C and guides D, of the pulleys $l$ $m$, ropes $n$ $n$, and pulleys $k$ $k$ of platform A, as described.

7. The combination, with the movable or wheeled wagon-platform A, having dump B, of the recessed posts D, with pulleys $m$, elevating-box C, with pulleys $l$ and ropes $n$ $n$ running to pulleys $k$, respectively, on platform A, as described.

In testimony that I claim the foregoing hoisting apparatus I have hereunto set my hand this 12th day of January, A. D. 1880.

PASCAL H. SAMUELL.

Witnesses:
LUTHER THURLOW,
D. D. HARDY.